April 3, 1956 R. N. JANEWAY 2,740,360
RAILWAY PASSENGER CAR TRUCK
Filed Aug. 30, 1951 4 Sheets-Sheet 2
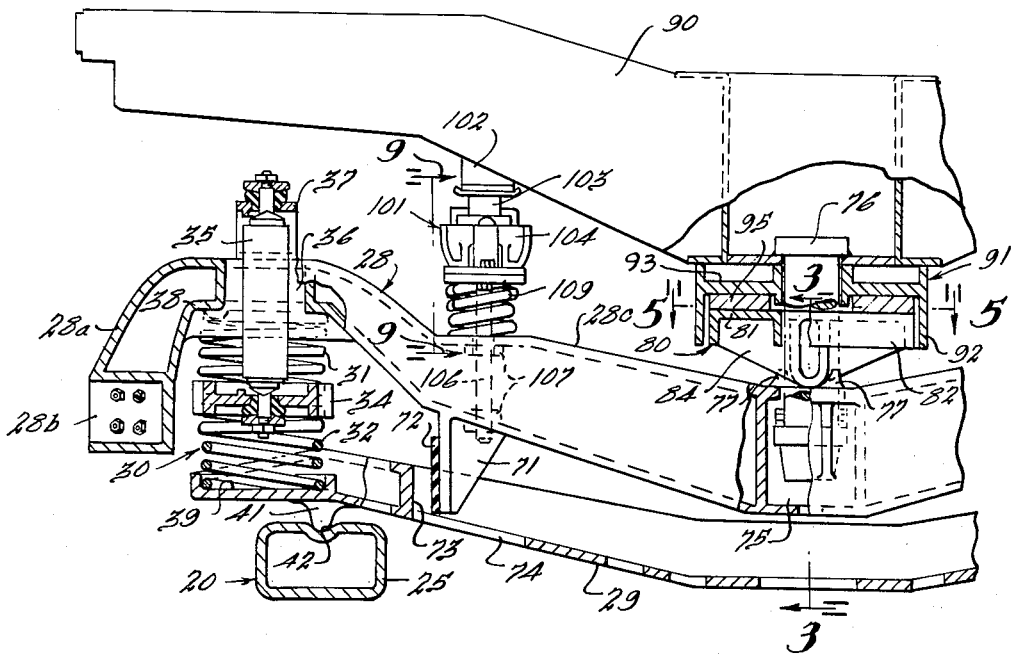
INVENTOR.
Robert N. Janeway
BY
Harness and Harris
ATTORNEYS.

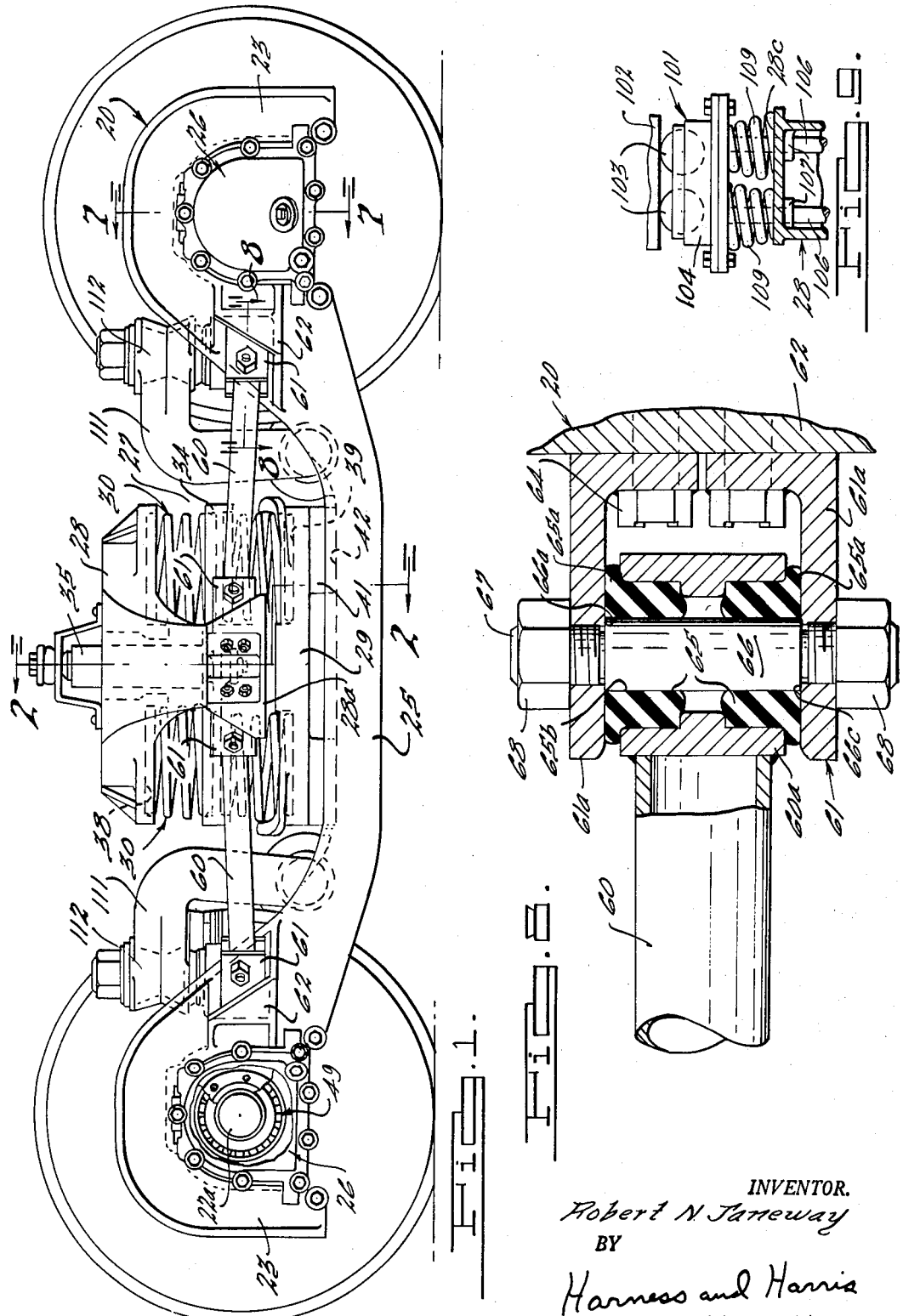

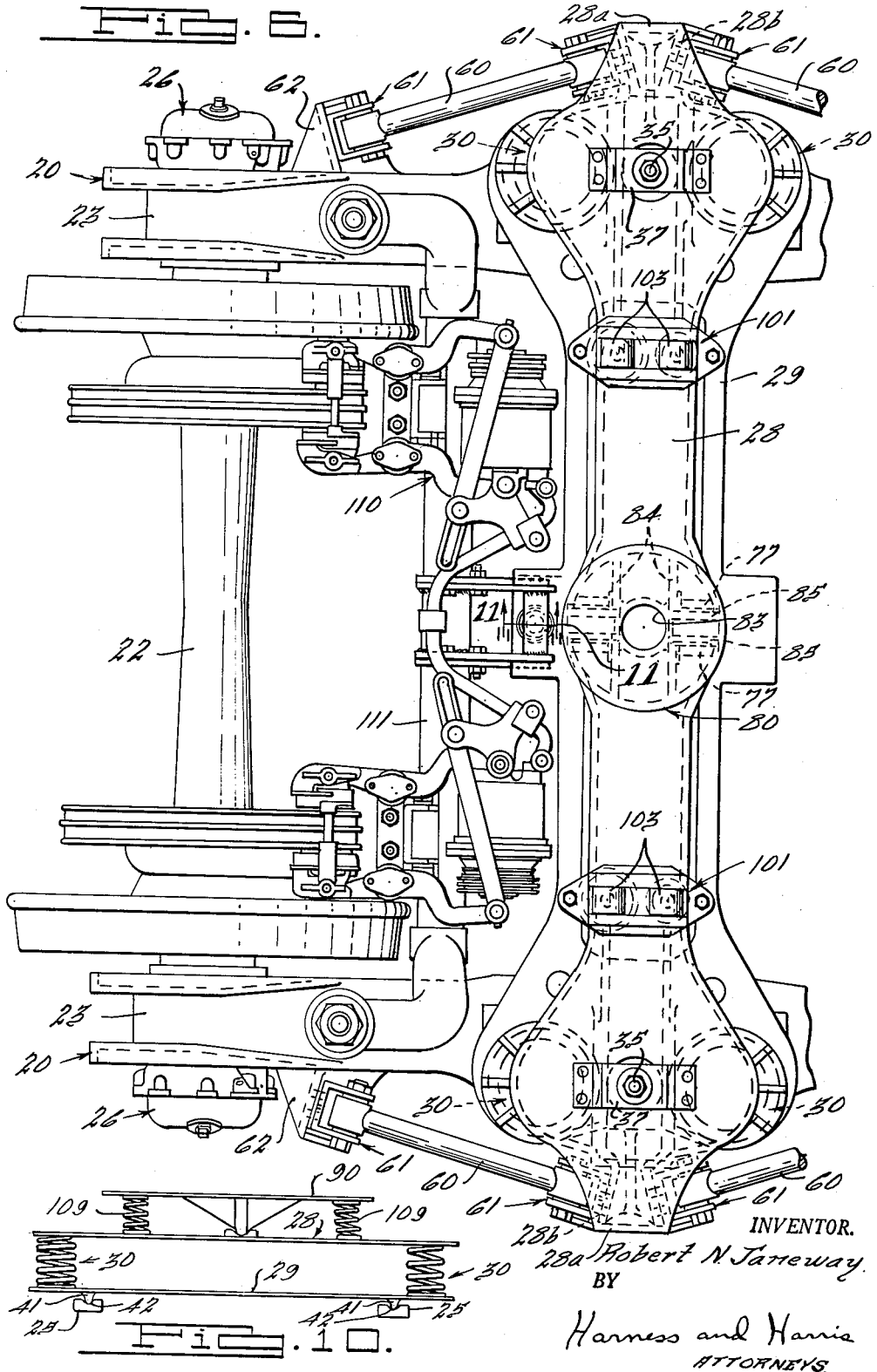

April 3, 1956 R. N. JANEWAY 2,740,360
RAILWAY PASSENGER CAR TRUCK
Filed Aug. 30, 1951 4 Sheets-Sheet 4
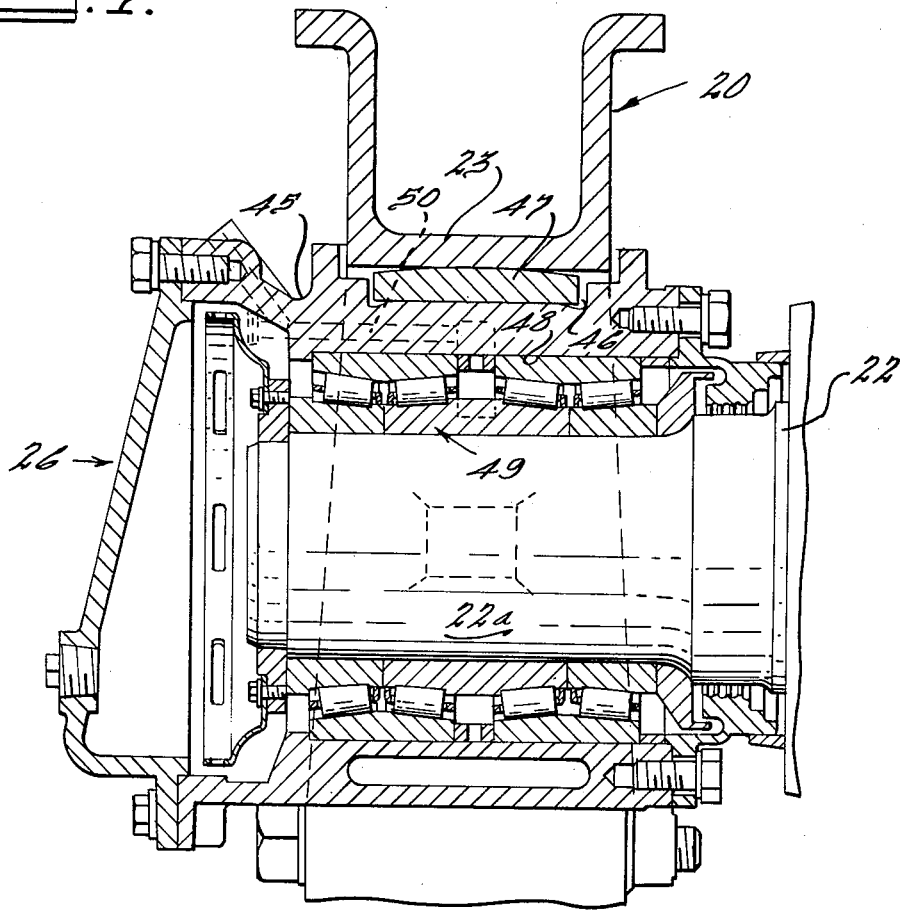
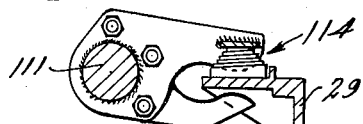
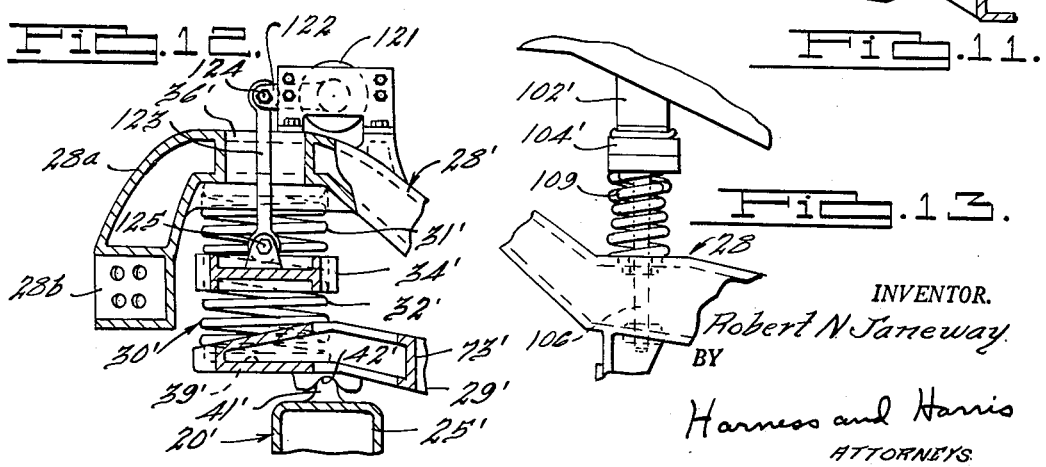
INVENTOR.
Robert N Janeway
BY
Harness and Harris
ATTORNEYS

United States Patent Office 2,740,360
Patented Apr. 3, 1956

2,740,360
RAILWAY PASSENGER CAR TRUCK

Robert N. Janeway, Detroit, Mich., assignor to Chrysler Corporation, Highland Park, Mich., a corporation of Delaware Application August 30, 1951, Serial No. 244,285

24 Claims. (Cl. 105—200)

This invention relates to a railway truck particularly adapted for passenger car service wherein the truck structure has been simplified to an unprecedented degree to drastically reduce truck weight, cost and maintenance requirements while at the same time providing a truck structure that has all the essentials for optimum riding qualities.

It is a primary object of this invention to provide a truck bolster suspension that will eliminate as much weight as possible from the truck without adversely affecting the riding qualities or the durability of the truck.

It is still another object of this invention to replace certain of the usual elements of the more or less conventional passenger car trucks with novel dual function elements so as to permit a consequent reduction in the number of truck parts and accordingly a reduced truck cost and weight.

It is a further object of this invention to simplify the design of the required truck elements and to arrange these elements in a novel manner whereby improved riding qualities are received at a minimum cost.

It is still another object of this invention to mount the car body bolster on the truck bolster in such a manner that a minimum of road shock and vibration will be transmitted to the car bolster.

It is still another object of this invention to provide novel stabilizing link means for controlling the movement of a resiliently suspended truck bolster.

Some of the outstanding features of this passenger car truck that permit the achievement of the aforementioned objects and advantages are as follows:

1. The usual truck transom frame and/or swing hangers are eliminated;

2. The spring plank is supported directly on the side frames by bearing means that maintain square alignment of the truck side frame assemblies. This plank arrangement also makes possible an outboard spring seat location for the truck bolster supporting springs so as to provide greater stability against car roll on track curves;

3. The truck bolster, that is supported directly on the spring plank through two sets of spring units located at each side of the truck, is stabilized by four (4) longitudinally extending, transversely angled, pivotally mounted, stabilizing links. These links each have the opposite ends thereof pivotally connected to the truck bolster and a side frame respectively by resiliently mounted connections that provide for both vertical and horizontal or lateral relative movement between the truck bolster and the side frames. The resistance offered by the resilient stabilizing link end connections to lateral bolster movement is approximately the same as that achieved through the use of bolster supporting swing hangers in other known types of railway trucks;

4. A "torsion neutralizer" action is provided for the car body by the rockably mounted truck bolster supported center plate when the car body is stabilized thereon by preloaded, conical, coil springs interposed between the car body side bearings and the truck bolster. These conical coil springs provide a progressively increasing deflection rate up to the limited maximum travel of the springs;

5. The bolster supporting spring group mounted on opposite ends of the spring plank each consist of two columns of nested, cylindrical, coil springs. Each column of nested springs includes two superimposed spring units arranged in series and separated by an intermediate spring seat. Damping means extend between the intermediate spring seat and the truck bolster so as to provide damping across the upper set of superimposed coil spring units; and 6. The truck construction lends itself to the use of disc type brake gear although other types of brake gear may also be utilized.

A more detailed description of the aforementioned novel truck structure is set forth hereinafter and is clearly disclosed in the related drawings wherein:

Fig. 1 is a side elevational view of a railway truck that embodies this invention;

Fig. 2 is a partial sectional elevational view of the load supporting portion of the truck structure shown in Fig. 1, the view being taken along the line 2—2 of Fig. 1;

Fig. 3 is a sectional elevational view of the truck bolster mounted center plate, the view being taken along the line 3—3 of Fig. 2;

Fig. 4 is a fragmentary sectional elevational view of a portion of the truck bolster mounted center plate unit, the view being taken along the line 4—4 of Fig. 3;

Fig. 5 is a fragmentary plan view of a portion of the truck center plate unit, the view being taken along the line 5—5 of Fig. 2;

Fig. 6 is an enlarged plan view of one-half of the truck shown in Fig. 1;

Fig. 7 is an enlarged sectional elevational view of the truck journal box construction, the view being taken along the line 7—7 of Fig. 1;

Fig. 8 is an enlarged, fragmentary, sectional elevational view of a stabilizing link end connection, the view being taken along the line 8—8 of Fig. 1;

Fig. 9 is an enlarged fragmentary side elevational view of the car body stabilizing springs, the view being taken along the line 9—9 of Fig. 2;

Fig. 10 is a diagrammatic sketch of the truck load supporting suspension that provides the torsional neutralizer action for the car body;

Fig. 11 is a fragmentary sectional elevational view of the brake gear support on the spring plank, the view being taken along the line 11—11 of Fig. 6;

Fig. 12 is a sectional elevational view taken transversely of a truck across the load supporting elements thereof, disclosing a modified form of certain features of this invention; and Fig. 13 is a fragmentary side elevational view of a modified form of car side bearing construction that may be used.

Fig. 1 of the drawings shows one side of a railway truck that embodies this invention. This truck (see Figs. 1 and 6 particularly) includes a pair of parallel, longitudinally extending, transversely spaced equalizer or side frame members 20, each of which is supported at each end by the journal portions of a pair of transversely extending, longitudinally spaced, wheeled axles 22. Side frames 20 are of a simplified design and each frame consists of a single longitudinally extending, centrally disposed, beam-like load supporting member 25 of box-like cross section (see Fig. 2), that has an upstanding, integral, inverted U-shaped, journal box housing portion 23 projecting from opposite ends thereof. Journal box housings 23 receive the journal bearing assemblies 26 that are mounted on the axle journal portions at each end of the axles 22. The journal bearing assemblies 26 used with this truck may be of more or less conventional type such as that shown in Fig. 7 or any other known type of bearing assembly may be used in the alternative. Fig. 7 shows the side frame journal bearing housing 23 surrounding the casing 45 of the bearing assembly 26. A seat 46 is formed in the upper exterior surface of the casing 45 to receive the side frame rocker block 47. The upper surface of rocker block 47 is arched transversely of the truck to provide for a slight amount of transverse tilting of the side frames 20 relative to the axles 22. Within the casing 45 and arranged between the upper side of the axle journal portion 22a and the inner wall 48 of the casing 45 is the roller bearing unit 49. A lubricant transfer conduit 50 may be included in the casing 45 to insure the application of lubricant to the roller bearings of the bearing unit 49.

The depression 27, located between the upstanding journal box housing 23 of each side frame, provides space to receive the end portions of the superimposed, transversely extending, truck bolster member 28 and the spring plank member 29. Bolster member 28 is resiliently supported at each of its ends on the ends of the underlying spring plank member 29 by means of a pair of spring columns 30 of nested spring formation.

Each spring column 30 is composed of a pair of superimposed, upper and lower, series arranged, nested, spring groups 31 and 32 respectively (see Fig. 2). The springs of the upper spring groups 31 may be softer, that is, have a lower rate of deflection, than the springs 32 of the lower spring group although spring groups 31 and 32 may be of identical construction and deflection rate. If relatively soft springs 31 are used then these soft springs 31 are adapted to readily cushion any slight shock loads or impact forces that may be transmitted to the bolster 28. The stiffer springs 32 are adapted to cushion any major shocks or impact loads and they cooperate with the softer springs 31 to provide the required resilient support for the bolster 28 on the plank 29. Located intermediate the upper and lower spring groups 31 and 32 of each spring column 30 is a plate-like spring seat 34 that has recesses in its upper and lower sides to receive the adjacent ends of the superimposed springs 31, 32. Seat members 34 not only provide a means for fixedly supporting the upper springs 31 on the lower spring 32 but in addition seats 34 provide a means for connecting an energy absorber or vibration damping device 35 across the upper, relatively soft, spring groups 31.

As clearly shown in Figs. 2 and 6, a vibration damping or energy absorbing device 35, that may be somewhat similar to a conventional motor vehicle shock absorber, is connected between the intermediate spring seats 34 at each side of the truck and the overlying end portions of bolster 28. The upper ends of the absorber devices 35 extend through openings 36 in the bolster frame 28 and are connected to the bolster by the substantially inverted U-shaped bracket members 37. The lower ends of the absorber devices 35 are connected to the intermediate spring seats by portions of the absorbers that penetrate and are anchored to the seats 34. Preferably the connections of the absorber devices 35 to the bolster brackets 37 and the spring seats 34 are such as to permit universal pivotal movement of the ends of the absorber devices 35 relative to the spring seats 34 and bolster mounted brackets 37. The disclosed energy absorber devices 35 and their end connections are more clearly and most completely disclosed in the co-pending applications of Robert N. Janeway, Serial No. 16,234 filed March 22, 1948, now U. S. Patent 2,574,788, and Serial No. 145,185 filed February 20, 1950, now U. S. Patent 2,690,818, which applications are specifically directed to this constant friction force energy absorber device. Obviously different types of energy absorbers having different damping characteristics can be substituted for the units 35 to produce different results.

It will be noted (see Figs. 2 and 6) that the spring columns 30 that support the truck bolster 28 on the plank 29 are located outboard of the side frames 20. This arrangement tends to provide increased stability in the truck to resist car roll when the truck is traversing a curved track or the like. Fig. 2 also discloses that the upper and lower ends of the spring columns 30 are firmly secured to the bolster member 28 and the plank member 29 by the spring receiving recesses 38 and 39 respectively.

Depending from the underside of each end of the spring plank member 29 (see Figs. 1 and 2) adjacent each end thereof, are a pair of spaced apart, bearing ribs 41 that extend parallel to and overlie the load supporting portions 25 of the side frames 20. Bearing ribs 41 have rounded lower ends that are journaled in depressed, curved surfaced, grooves 42 that are formed in the upper side of the box-like side frame load supporting members 25. As each end of the plank 29 has a pair of depending bearing ribs 41 rockably engaged in a pair of substantially mating grooves 42 formed in the side frame members 25, it is thought to be obvious that the plank member 29 will maintain square alignment of the spaced side frames 20. Furthermore, due to the ability of the ribs 41 to rock in the grooves 42 about horizontal, longitudinally extending axes, means are provided to equalize the side frames for relative vertical movement while preventing unsquaring movement thereof.

From the foregoing description of the disclosed railway truck it is thought to be obvious that the bolster 28 is connected to and is floatingly supported by the transversely spaced sets of spring units 30. Furthermore, the bolster supporting spring units 30 are seated on the opposite ends of the plank member 29 which latter member is rockably connected to the spaced apart side frames 20 by the rocker bearing connections 41, 42. As there is no transom frame or any other frame rigidly connecting the side frames and the bolster 28 and as the bolster 28 is floatingly supported on the spring plank 29 by spring columns 30 that readily permit lateral movement of the bolster 29 relative to the truck side frames 20, it is necessary to provide suitable means to stabilize the spring supported bolster 28 relative to the side frames 20. A novel, simplified form of bolster stabilizing means is provided by the stabilizing links 60. The novel functioning of the links 60 is based on their arrangement relative to and their manner of connection with their associated truck components. Four of the links 60 are utilized here to stabilize the bolster 28 although a fewer number might be used. Two links each are shown connected to each end of the bolster 28 and the two links at each end of the bolster 28 extend lengthwise of the truck in opposite directions away from the bolster. It will be noted (see Figs. 1 and 6) that the opposite ends of bolster 28 are each formed with a downwardly and outwardly extending leg portion 28a. Legs 28a each include a pair of oppositely facing bracket support portions 28b for mounting pairs of U-shaped brackets 61 (see Fig. 8). Brackets 61 are used to connect the adjacently disposed ends of the stabilizing links 60 to the bolster 28. Bolster bracket support portions 28b are at about the level of the wheel axles for a reason that will be subsequently explained. The other, remotely disposed, ends of the stabilizing links 60 converge inwardly towards the side frame journal box housings 23 (see Fig. 6) and are connected to outwardly projecting side frame supported brackets 62 by U-shaped brackets 61 that are identical to those utilized to connect the opposite, adjacently positioned, ends of the links 60 to the bolster bracket portions 28b.

The specific connection between the end of a stabilizing link 60 and the member to which it is connected is clearly shown in Fig. 8. This figure shows the connection of a stabilizing link end to a side frame supported bracket 62. As the connections at opposite ends of the stabilizing links 60 are identical, it is thought the description of one connection is all that is necessary for a complete understanding of both link end pivotal connections. The U-shaped bracket 61 (see Fig. 8) is suitably connected to the supporting bracket 62 by bolt and nut means 64 such that the opening between the bracket legs 61a extends vertically. The end of the link 60 carries a sleeve-like terminal portion 60a that is adapted to be positioned between the bracket legs 61a with the bore of the sleeve portion 60a extending horizontally and transversely of the bracket legs 61a. A pair of sleeve-like resilient bushings or collars 65 are mounted in the opposite ends of the bore through the link end portion 60a. Bushings 65 have flanged end portions 65a that are formed by the compression of the outer ends of the bushings between the ends of the link portion 60a and the inner sides of the bracket legs 61a. A hollow, sleeve-like, pivot pin 66 is threaded through the bores 65b in the link supported collars 65. The pivot pin 66 provides a shoulder at each end thereof to engage the inner surfaces of the bracket legs 61a. These pivot pin shoulders limit the amount of compression of the collar flange portions 65a. A bolt 67 is threaded through openings in the bracket legs 61a and through the bore in pivot pin 66 to pivotally connect the link 60 to the bracket 61. Nuts 68 anchor the bolt 67 in the bracket 61.

As the axes of the pivot pins 66 and the resilient bushings or collars 65 are in a horizontal plane, it is thought to be obvious that the disclosed link end connections offer a comparatively low torsional resistance to vertical movement of bolster 28. However, when the spring supported bolster is displaced laterally or transversely of the truck, the resilient bushings 65 in the link end pivot connections are subjected to a comparatively high radial deformation due to compressive forces applied to the links 60 and also, because of the initial angularity of the links 60 relative to the side frames 20 (see Fig. 6), the bushings 65 are also subjected to a twist action about a vertical axis that also tends to compress portions of the bushings 65. Accordingly, the link end pivot connections provide a comparatively high resistance to lateral movement of the bolster. It is thought to be obvious that the lower deflection rate spring groups 30 that may be used in a truck of this type would readily permit lateral movement of the bolster 28 and thus it is necessary to provide a suitable stabilizing control for this lateral movement. The links 60 and their resiliently mounted end connections provide the required stabilizing control in a simplified and novel manner.

It should be noted that the four (4) stabilizing links 60 not only control vertical and lateral movement of the bolster 28, but in addition, they cushion and control longitudinal thrust that is transmitted to the bolster. As a result of the design and arrangement of the stabilizing links 60, only four (4) links are required to completely stabilize the truck and accordingly a very definite step has been taken to reduce the number of parts, the weight and the cost of passenger car trucks without reducing optimum ride characteristics. As the links 60 are arranged to normally extend horizontally at the level of the axles, vertical movement of the axles produces the minimum movement of the links longitudinally of the truck and consequently the minimum disturbance to the bolster 28.

While the bolster spring supporting columns 30 and the stabilizing linkages 60 permit a certain amount of relative movement transversely of the truck between the bolster 28 and the spring plank 29, means are also included to positively limit this relative movement. From Fig. 2 it will be noted that adjacent each end of the bolster 28, there extends from the underside thereof, downwardly projecting bracket-like stop members 71. The outwardly disposed faces of the stops 71 are covered with resilient bumper elements 72. Bumper elements 72 are arranged to engage the adjacently positioned face of the web 73 of the plank member 29 after a predetermined relative movement between the bolster 28 and plank 29 in a direction transversely of the truck. Obviously with stop means 71—73 at each end of the superimposed bolster and plank members, the lateral movement of the bolster 28 is limited in each direction. On downward vertical movement of the bolster 28 relative to the spring plank 29, the bolster carried stops 71 can pass through the openings 74 in the spring plank 28 and thus be free of any interference with the plank 29.

In addition to the aforementioned novel ride controlling features of this truck, there is also included a truck bolster mounted centerplate construction that cooperates with other bolster mounted truck structure to provide a "torsional neutralizer" device that insures improved riding characteristics in this truck. The "torsional neutralizer" construction herein disclosed is a modification of and an improvement over the similar device included in Robert N. Janeway et al. Patent 2,371,796. In the truck herein disclosed, the truck bolster 28 is formed with a centrally disposed, cup-like cavity 75 that is adapted to receive and retain the lower end portion of the usual, vertically disposed, center pin 76. The cavity 75 is of considerably greater diameter than the diameter of the center pin 76 that is mounted therein so as to permit the pin 76 to tilt or oscillate transversely of the truck as the car body bolster 90 tilts relative to the truck bolster 28 in the manner subsequently described. The upper surface 28c of the bolster 28, adjacent the opening to the cavity 75, is provided with a pair of bosses 77 that extend radially outwardly from opposite sides of the opening to the cavity 76, in directions longitudinally of the truck and centrally disposed relative thereto. Each of the bosses 77 has a depressed, arcuate groove 78 in its upper surface that extends along the longitudinal centerline of the truck. Grooves 78 provide the rocker bearings for the centerplate member 80 that is adapted to support the car body bolster 90 on the truck bolster 28 for both rotation about the vertical center pin 76 and oscillation about the horizontal axes of the boss grooves 78. Centerplate 80 has a plate-like upper surface 81 formed with a depending peripheral flange 82 and a centrally disposed, vertically extending opening 83 that receives the upper portion of the center pin 76. Depending from the underside of the plate surface 81 are a first pair of spaced apart, chord-like, vertically disposed, webs 84 that normally extend in a direction transversely of the truck, that is, longitudinally of the bolster. Webs 84 are adapted to abut against the radially inwardly disposed ends of the bearing bosses 77 to prevent shift of the centerplate 80 longitudinally of the truck. Also depending from the underside of the centerplate surface 81, and extending across the centerplate 80 in chord-like arrangement, are a second pair of spaced apart, vertically disposed, webs 85 that are connected together at their lower ends by the arcuately formed portions 86. The arcuately formed portions 86 provide centerplate bearing ribs that are adapted to be matingly received in the arcuately shaped grooves 78 of the truck bolster mounted bearing bosses 77. The rocker bearing connections 78, 86 provide means for the centerplate 80 and its supported car bolster 90 to rock transversely of the truck about a pivot or rocker axis extending longitudinally of the truck along its centerline. Connected to the underside of the car body bolster 90 is an annular plate member 91 that has a peripheral flange 92 that surrounds the peripheral flange 82 of the centerplate 80. Body bolster plate 91 and centerplate 80 have superimposed, spaced apart, surfaces 93 and 81 respectively between which is mounted a ring-like bearing plate 95. Bearing plate 95 provides a bearing support for the rotation of body bolster plate 91 relative to centerplate 80 about the center pin 76 as an axis. With the construction herein disclosed it is obvious that the car body that is supported by the body bolster 90 may rotate about the center pin 76 during movement of the truck along curved tracks and may also rock on the truck bolster 28 about bearings 78, 86.

Cooperating with the centerplate mounting 80 to provide the aforementioned torsional neutralizer action, are the car body stabilizing devices 101 (see Figs. 2 and 9) that extend between each of the adjacent ends of the truck bolster 28 and the overlying car body bolster 90.

Depending from the underside of the car bolster 90 at regions adjacent each end thereof are side bearing bumper elements 102. Bumper elements 102 each include a lower horizontal surface portion that is adapted to be engaged with a truck bolster mounted roller bearing 103. The roller bearings 103 are preferably pin mounted on the roller support plates 104. Roller support plates 104 each have a pair of spaced apart stems or legs 106 that are each mounted for vertical reciprocation in the guide sleeves 107 of the truck bolster 28. Mounted between the underside of the roller support plates 104 and the surface 28c of truck bolster 28, and arranged in concentric relation about the support plate stems 106, are conically coiled compression springs 109. Adjacent springs 109 are inverted to permit nesting in side by side relationship. The springs 109 provide a progressively increasing deflection rate up to their limited maximum travel. The springs 109, which are precompressed on installation, have a limited travel beyond their original precompression such that they will bottom and prevent undesirable loss of car stability when the truck is traveling around curves or the like. Furthermore, the precompression of the springs 109 is such that even on maximum transverse tilting of the car body in either direction, the springs 109 at each end of the bolster 28 will each remain compressed to varying degrees so that they cooperatively act to control movement of the car body. Neither spring at either end of the bolster is fully relieved from its precompression loading regardless of the degree of permitted car tilt or roll.

It is thought to be obvious that the primary function of the car body stabilizing spring devices 101 is to resist undesirable transverse car body tip or roll. Such tip or roll would normally be possible due to the rocker bearing mounting of the car body bolster 90 on the truck bolster 28 if stabilizing devices of some type were not included in this truck construction. Another advantage of the stabilizing devices 101 is that they reduce the bending moments in the truck bolster member 28 for they resiliently support a part of the load of the car body bolster 90 adjacent the ends of the truck bolster 28 and accordingly reduce the car load applied to the truck bolster rocker bearings 77 located at the center of the truck bolster 28. Reduction in bending moments in the truck bolster 28 will permit reduction in size, weight and cost of the truck bolster member.

With the car body bolster support particularly disclosed in Fig. 2 and diagrammatically shown in Fig. 10, it is thought to be obvious that only the minimum amount of vibration and other truck and track generated disturbances will be transmitted from the truck and plank to the car body bolster 90. Looking at Fig. 10, it will be noted that raising or lowering of the side frames 25 due to uneven rail joints, track elevations, or the like, causes transverse rocking of the plank member 29 about its end mounted rocker bearings 41, 42. The rocking or tilting movement of the plank 29 is transmitted to the spring columns 30 which each include both damped and undamped springs which springs are arranged to absorb the impacts and readily absorb the vibrations transmitted thereto. The spring columns 30 absorb a major portion of vibratory and/or tilting motion of the plank 29 and what tilting motion that is transmitted by the spring columns 30 to the truck bolster 28 is neutralized by the mounting means utilized to support car body bolster 90 on the truck bolster 28. As the truck bolster 28 is connected to the body bolster 90 through the rockable, centrally disposed, centerplate 80 it is obvious that the bolster 28 can tilt or tip transversely of the truck about its centerplate rocker bearings 78, 86 without transmitting the transverse tip or roll to the superimposed car body bolster 90. While the ends of the truck bolster 28 are connected to the car bolster 90 through the resilient stabilizing devices 101, still the period and amplitude of the vibrations transmitted to the stabilizing devices 101 are usually so small that the springs 109 of the stabilizing devices 101 cushion and absorb the movement without transmitting it to the overlying end portions of the car body bolster 90. Due to the truck suspension system herein disclosed improved riding characteristics are achieved with a relatively simplified lightweight, inexpensive truck.

Figs. 1 and 6 show disc-type brake gear 110 that is resiliently supported on the side frames 20 by means of the hanger shafts 111 and their mountings 112. Opposite ends of the transversely extending, U-shaped shafts 111 are connected to the spaced side frames 20 through the connections 112 that include sleeve-type resilient bushings (not shown). Brake gear 110 is also arranged to have the shafts 111 thereof resiliently connected to the spring plank 29 through the centrally disposed connection 114 that is shown in detail in Fig. 11. As the specific type of brake gear shown does not form a part of this invention, and as other types of brake gear such as clasp brakes could be used with this truck, it is not thought that a detailed description of the brake gear is necessary.

Fig. 12 of the drawings, which is similar to the end portion of the structure shown in Fig. 2, represents a modified form of this invention. In this modified form the side frame members 25' are formed with upwardly extending bearing ribs 41' that seat in the depressed arcuate grooves 42' formed in the underside of the spring plank member 29'. Spring plank member 29' mounts pairs of series arranged spring columns 30' that have an intermediate spring seat 34' located between the upper and lower spring groups 31', 32'. In this form of the invention a different type of energy absorber 121 is used from that indicated at 35 in Figs. 1, 2 and 6. Absorbers 121 are of the hydraulic type and are located at each end of bolster 28 on the upper surface 28c thereof. Each absorber 121 has a lever arm 122 that is adapted to oscillate about a horizontally extending axis. The free end of lever arm 122 is pivotally connected to a rigid link 123 at 124 and the other end of the link 123 is pivotally connected at 125 to the intermediate spring seat member 34'. Absorber 121 functions in the same manner as the friction type energy absorber 35 shown in the other form of the invention. Suitable hydraulic damping means are included in the energy absorber units 121 to dampen oscillations of the car body and any tendency of spring seat member 34' to vibrate between the two spring groups 31', 32'.

Fig. 13 shows a modified type of car side bearing construction that may be used in the stabilizing devices 101 that are mounted between the truck bolster 28 and the car bolster 90. In this modified form, the roller devices 103, shown in Fig. 9, are omitted and the car mounted bumper block 102' has its lower surface in direct sliding contact with the upper surface of the spring mounted bumper plate 104'. This modified form provides sliding surface engagement between the engaged body and truck bolster mounted stabilizer elements whereas the form of stabilizer device shown in Fig. 9 provides rolling contact between the engaged car and truck bolster mounted stabilizer elements.

The novel type of stabilizing link arrangement and pivot connection herein disclosed can be advantageouly used in a passenger car truck due to the relative constancy of the load in a passenger car as compared to the wide variation in loading of a freight car. In a freight car, due to the wide variation in load, the means utilized to restrain lateral movement of the car body must be of a variable nature that will exert a retarding effect roughly proportional to the car load. Swing hangers provide such a lateral movement control device due to the fact that the car load is supported directly on the swing hangers and transverse or lateral components of the car load supported by the swing hangers directly resist lateral movement of the car body. In a passenger car where the load is substantially constant, a relatively constant type of resistance to lateral movement may be utilized and the resilient mountings 65 for the ends of the stabilizing links 60 provide the required control for car body lateral movement in an economical, novel manner. The resilient bushings 65, due to their geometry in the truck, and their arrangement in the support brackets 61, provide a substantially constant type of resistance to truck bolster lateral movement with the resistance progressively increasing with increase in the degree of lateral movement. At the same time, the bushings 65 resiliently cushion longitudinal impact loads and permit relative vertical movement of the bolster 28 relative the spring plank 29. The disclosed combination of the simplified form of stabilizing links with the simplified form of truck structure is thought to represnt a material advance in this field.

I claim:

1. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member, a truck bolster member extending transversely of said side frames and mounted on said spring columns in overlying relationship to said plank member, and a pair of oppositely extending, longitudinally disposed, stabilizing links each connected between an end of the truck bolster and the side frame adjacent thereto so as to provide the only direct connection between the bolster and side frames, said stabilizing links having pivotal connections to the truck bolster and the side frames with the pivot axes thereof extending transversely of the truck and substantially horizontally and including resilient means arranged in the pivotal connection and cooperating therewith to provide relatively low resistance to vertical movement of the truck bolster relative to the plank member while providing relatively high resistance to both transverse and longitudinal movement of the truck bolster relative to the side frames.

2. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed, stabilizing links each connected between an end of the truck bolster and the side frame adjacent thereto, said stabilizing links providing the only direct connection between the bolster and side frames and having pivotal connections at their end portions to the truck bolster and the side frames with the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames, said stabilizing links at each end of the truck bolster being arranged in a plane positioned at substantially the level of the axles and each link diverging inwardly from a portion of the truck bolster outboard of the side frames towards an end portion of the adjacent side frame located inboard thereof.

3. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links connected between each end of the truck bolster and the side frame adjacent thereto, said stabilizing links providing the only direct connection between the bolster and side frames with said links having pivotal connections to the truck bolster and the side frames with the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames, said spring columns each including a pair of superimposed spring groups of different deflection rates that have a rigid spring seat member mounted therebetween, and an energy absorber connected between each spring seat and the truck bolster member.

4. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links connected between each end of the truck bolster and the side frame adjacent thereto and providing the only direct connection therebetween, said stabilizing links having pivotal connections to the truck bolster and the side frames with the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames, said spring columns each including a pair of stacked, series arranged, spring groups of equal spring rates arranged with an intermediate spring seat located between and connected to the stacked spring groups, and vibration damping means connected between each spring seat and the truck bolster member to damp vibrations of the truck bolster.

5. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed, stabilizing links at each end of the bolster, each link being connected between an end of the truck bolster and the side frame adjacent thereto, said stabilizing links providing the only direct connection between the bolster and the side frames and having pivotal connections to the truck bolster and the side frames with the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames, said stabilizing links at each end of the truck bolster being arranged in a plane positioned at substantially the level of the axles and each link diverging inwardly from a portion of the truck bolster outboard of the side frames towards an end portion of the adjacent side frame located inboard thereof, and interengageable stop means carried by said plank and truck bolster respectively arranged to limit movement of said truck bolster transversely of said side frames.

6. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, said rocker bearings comprising depending bearing ribs projecting from the underside of the plank member adjacent each end thereof and grooved formations extending longitudinally along the upper surface of said side frames shaped to matingly receive and journal said bearing ribs, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links each connected between an end of the truck bolster and the side frame adjacent thereto so as to provide the only direct connection therebetween, said stabilizing links having pivotal connections to the truck bolster and the side frames wtih the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames.

7. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, said rocker bearings comprising groove formations extending across the underside of each end of the plank member and upstanding bearing ribs projecting from the upper surface of each side frame and extending longitudinally thereof arranged to matingly engage and rockably seat in the plank member groove formation, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links connected between each end of the truck bolster and the side frame adjacent thereto, said stabilizing links providing the only direct connection between the bolster and side frames and having pivotal connections to the truck bolster and the side frames with the pivot axes thereof extending transversely of the truck and substantially horizontally and including resilient means arranged in the pivotal connections and cooperating therewith to provide relatively low resistance to vertical movement of the truck bolster relative to the plank member while providing relatively high resistance to both transverse and longitudinal movement of the truck bolster relative to the side frames.

8. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member at locations outboard of the adjacent side frames, said resilient columns each comprising a relatively stiff and a relatively soft resilient member arranged in series with an intermediate seat member located therebetween, a truck bolster member extending transversely of said side frames and supported only at its opposite ends by said plank mounted, series arranged, resilient columns, energy absorbing means connected between each intermediate seat member and the truck bolster member to damp vibrations of the truck bolster and seat members, and rigid stabilizing links extending longitudinally of the truck and pivotally connected between each end of the truck bolster and the adjacent side frame with the link pivot axes extending transversely of the truck and substantially horizontally, said stabilizing links providing the only direct connection between the bolster and side frames with the link pivot means including resilient means arranged to cooperate therewith to provide a relatively low resistance to relative vertical movement between the truck bolster and side frames while providing a relatively high resistance to lateral movement of the truck bolster relative to the side frames.

9. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member, a truck bolster member extending transversely of said side frames and supported only at its opposite ends by said plank mounted resilient columns, and rigid stabilizing links extending longitudinally of the truck that are pivotally connected between each end of the truck bolster and the adjacent side frame with the link pivot axes extending transversely of the truck and substantially horizontally, said stabilizing links providing the only direct connection between the bolster and side frames with the link pivot connections including resilient means arranged to cooperate therewith to provide a relatively low resistance to relative vertical movement between the truck bolster and side frames while providing a relatively high resistance to lateral movement of the truck bolster relative to the side frames.

10. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member, a truck bolster member extending transversely of said side frames and supported only at its opposite ends by said plank mounted resilient columns, and a pair of rigid stabilizing links extending longitudinally of the truck and pivotally connected between each end of the truck bolster and the adjacent side frame with the link pivot axes extending transversely of the truck and substantially horizontally, said stabilizing links providing the only direct connection between the bolster and side frames with the link pivot connections including resilient means arranged to cooperate therewith to provide a relatively low resistance to relative vertical movement between the truck bolster and side frames while providing a relatively high resistance to lateral movement of the truck bolster relative to the side frames, said stabilizing links at each end of the truck bolster extending in opposite directions and being arranged in a plane positioned at substantially the level of the axles with each link of each pair diverging inwardly from a portion of the truck bolster outboard of the side frames towards an end portion of the adjacent side frame located inboard thereof.

11. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member, a truck bolster member extending transversely of said side frames and supported only at its opposite ends by said plank mounted resilient columns, a pair of rigid stabilizing links extending longitudinally of the truck at each side thereof, each link being pivotally connected between an end of the truck bolster and the adjacent side frame with the link pivot axes extending transversely of the truck and substantially horizontally, said stabilizing links providing the only direct connection between the bolster and side frames with the link pivot connections each including resilient means mounting the associated link pivots in the bolster and side frames respectively so as to provide means to cooperate with the links to provide a relatively low resistance to relative vertical movement between the truck bolster and side frames while providing a relatively high resistance to lateral movement of the truck bolster relative to the side frames, and a car body bolster mounted on said truck bolster for limited rocking movement transversely of said truck side frames, the mounting for said body bolster on said truck bolster including rocker bearing means between the said bolsters located on the longitudinal centerline of the truck and resilient means extending between said bolsters resisting any relative rocking movement therebetween, said last-mentioned means for resisting relative rocking movement between said bolsters comprising a stabilizing device extending between each of the adjacent ends of the said bolsters, each stabilizing device comprising precompressed resilient elements mounted on one of said bolsters supporting a vertically movable contact member arranged to be frictionally engaged with a bumper element mounted on the other of said bolsters.

12. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while resisting relative longitudinal movement and maintaining side frame squareness, vertically extending resilient columns mounted on opposite ends of said plank member, a truck bolster member extending transversely of said side frames and supported only at its opposite ends by said plank mounted resilient columns, a pair of rigid stabilizing links extending longitudinally of the truck at each side thereof, each link being pivotally connected between an end of the truck bolster and the adjacent side frame with the link pivot axes extending transversely of the truck and substantially horizontally, said stabilizing links providing the only direct connection between the bolster and side frames with the link pivot connections each including resilient means mounting the associated link pivot axes and arranged to cooperate with the links arranged to provide a relatively low resistance to relative vertical movement between the truck bolster and side frames while providing a relatively high resistance to lateral movement of the truck bolster relative to the side frames, and a car body bolster mounted on said truck bolster for limited rocking movement transversely of said truck side frames, the mounting of said car body bolster on said truck bolster comprising a vertically extending opening in said truck bolster along the longitudinal centerline of the truck, a vertically extending center pin mounted in and projecting upwardly from said opening, a centerplate with an opening therein mounted about the upwardly projecting end of said center pin, said centerplate having bearing portions thereof journaled on said truck bolster with the pivot axis thereof extending longitudinally of the truck to provide for rocking of said centerplate transversely of said truck, a bearing means mounted on said centerplate and a car body bolster support plate mounted on said bearing means for rotation about said center pin.

13. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member, a truck bolster member extending transversely of said side frames and supported only at its opposite ends by said plank mounted resilient columns, rigid stabilizing links pivotally connected between each end of the truck bolster and the adjacent side frame with the link pivot axes extending transversely of the truck and substantially horizontally, said stabilizing links providing the only direct connection between the bolster and side frames with the link pivot connections including resilient mounting means arranged to cooperate with the links to provide a relatively low resistance to relative vertical movement between the truck bolster and side frames while providing a relatively high resistance to lateral movement of the truck bolster relative to the side frames, and a car body bolster mounted on said truck bolster for limited rocking movement transversely of said truck side frames, the mounting of said car body bolster on said truck bolster comprising a vertically extending opening in said truck bolster along the longitudinal centerline of the truck, a vertically extending center pin mounted in and projecting upwardly from said opening, a centerplate with an opening therein mounted about the upwardly projecting end of said center pin, said centerplate having bearing portions thereof journaled on said truck bolster with the pivot axis thereof extending longitudinally of the truck to provide for rocking of said centerplate transversely of said truck, a bearing means mounted on said centerplate and a car body bolster support plate mounted on said bearing means for rotation about said center pin, and car body stabilizing means comprising a bumper plate mounted on each end of the truck bolster for vertical reciprocation relative thereto, precompressed resilient means that have a limited, progressively, increasing, rate of deflection continuously urging said bumper plates upwardly towards said body bolster and bumper blocks mounted on said car body bolster having portions thereof continuously engaged with the bumper plates of said truck bolster.

14. A railway truck comprising a pair of longitudinally spaced, wheeled axles, a pair of transversely spaced side frames mounted on and extending between said axles, a plank member extending between and supported on said side frames by pivotal connections having pivot axes extending longitudinally of the side frames and substantially horizontally that permit relative vertical movement of the side frames while maintaining side frame squareness, vertically extending resilient columns mounted on opposite ends of said plank member, a truck bolster member extending transversely of said side frames and supported only at its opposite ends by said plank mounted resilient columns, rigid stabilizing links pivotally connected between each end of the truck bolster and the adjacent side frame with the link pivot axes extending transversely of the truck and substantially horizontally, said stabilizing links providing the only direct connection between the bolster and side frames with the link pivot connection including resilient mounting means arranged to cooperate with the links to provide a relatively low resistance to relative vertical movement between the truck bolster and side frames while providing a relatively high resistance to lateral movement of the truck bolster relative to the side frames, and a car body bolster mounted on said truck bolster for limited rocking movement transversely of said truck side frames, the mounting of said car body bolster on said truck bolster comprising a vertically extending opening in said truck bolster along the longitudinal centerline of the truck, a vertically extending center pin mounted in and projecting upwardly from said opening, a centerplate with an opening therein mounted about the upwardly projecting end of said center pin, said centerplate having bearing portions thereof journaled on said truck bolster with the pivot axis thereof extending longitudinally of the truck to provide for rocking of said centerplate transversely of said truck, a bearing means mounted on said centerplate and a car body bolster support plate mounted on said bearing means for rotation about said center pin, and car body stabilizing means comprising a bumper plate mounted on each end of the truck bolster for vertical reciprocation relative thereto, precompressed resilient means that have a limited, progressively, increasing, rate of deflection continuously urging said bumper plates upwardly towards said body bolster, roller bearing means mounted on said bumper plates, and bumper blocks mounted on said car body bolster having portions thereof continuously in rolling contact with said bumper plate supported roller bearing means.

15. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed, stabilizing links pivotally connected between each outboard end of the truck bolster and the side frame adjacent thereto with the link pivot axes extending transversely of the truck and substantially horizontally, said stabilizing links having pivotal connections to the truck bolster and the side frames including resilient means mounting the links on the bolster and side frames respectively and cooperating therewith to provide relatively low resistance to vertical movement of the truck bolster relative to the plank member while providing relatively high resistance to both transverse and longitudinal movement of the truck bolster relative to the side frames, said stabilizing links at each end of the truck bolster being arranged in a plane positioned at substantially the level of the axles and each link of each pair diverging inwardly from a portion of the truck bolster outboard of the side frames towards an end portion of the adjacent side frame located inboard thereof, and a car body bolster mounted on said truck bolster for limited rocking movement transversely of said truck side frames, the mounting for said body bolster on said truck bolster including rocker bearing means between the said bolsters located on the longitudinal centerline of the truck and resilient means extending between said bolsters resisting any relative rocking movement therebetween.

16. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed, stabilizing links pivotally connected between each outboard end of the truck bolster and the side frame adjacent thereto with the link pivot axes extending transversely of the truck and substantially horizontally, said stabilizing links having pivotal connections to the truck bolster and the side frames including resilient means mounting the links on the bolster and side frames respectively and cooperating therewith to provide relatively low resistance to vertical movement of the truck bolster relative to the plank member while providing relatively high resistance to both transverse and longitudinal movement of the truck bolster relative to the side frames, said stabilizing links at each end of the truck bolster being arranged in a plane positioned at substantially the level of the axles and each link of each pair diverging inwardly from a portion of the truck bolster outboard of the side frames towards an end portion of the adjacent side frame located inboard thereof, and a car body bolster mounted on said truck bolster for limited rocking movement transversely of said truck side frames, the mounting for said body bolster on said truck bolster including rocker bearing means between the said bolsters located on the longitudinal centerline of the truck and resilient means extending between said bolsters resisting any relative rocking movement therebetween, said last mentioned means for resisting relative rocking movement between said bolsters comprising a stabilizing device extending between each of the adjacent ends of the said bolsters, each stabilizing device comprising precompressed resilient elements mounted on one of said bolsters supporting a vertically movable contact member arranged to be frictionally engaged with a bumper element mounted on the other of said bolsters.

17. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links pivotally connected between each end of the truck bolster and the side frame adjacent thereto with the link pivot axes extending transversely of the truck and substantially horizontally, said stabilizing links having pivotal connections to the truck bolster and the side frames including resilient means mounting the links on the bolster and side frames respectively and cooperating therewith to provide relatively low resistance to vertical movement of the truck bolster relative to the plank member while providing relatively high resistance to both transverse and longitudinal movement of the truck bolster relative to the side frames, said spring columns each including a pair of superimposed spring groups of different deflection rates that have a rigid spring seat member mounted therebetween, and an energy absorber connected between each spring seat and the truck bolster member and a car body bolster mounted on said truck bolster for limited rocking movement transversely of said truck side frames the mounting of said car body bolster on said truck bolster comprising a vertically extending opening in said truck bolster along the longitudinal centerline of the truck, a vertically extending center pin mounted in and projecting upwardly from said opening, a centerplate with an opening therein mounted about the upwardly projecting end of said center pin, said centerplate having portions thereof journaled on said truck bolster to provide for rocking of said centerplate transversely of said truck, a bearing means mounted on said centerplate and a car body bolster support plate mounted on said bearing means for rotation about said center pin.

18. A railway truck comprising a pair of longitudinally spaced, transversely extending, wheeled axles, a pair of transversely spaced, longitudinally extending, beam-like side frames each having the opposite ends thereof supported on said axles, a plank member extending between and connected to said side frames intermediate said ends by rocker bearing means having pivot axes extending longitudinally of the side frames and substantially horizontally that permit relative vertical movement between said side frames while restraining relative longitudinal movement between said side frames, vertically extending spring columns mounted on each end of said plank member outboard of said side frames, a truck bolster member extending transversely of said side frames and mounted on said spring columns in overlying relationship to said plank member, and a pair of oppositely extending, longitudinally disposed stabilizing links pivotally connected between each end of the truck bolster and the side frame adjacent thereto with the link pivot axes extending transversely of the truck and substantially horizontally, said stabilizing links having pivotal connections to the truck bolster and the side frames including resilient means mounting the links on the bolster and side frames respectively and cooperating therewith to provide relatively low resistance to vertical movement of the truck bolster relative to the plank member while providing relatively high resistance to both transverse and longitudinal movement of the truck bolster relative to the side frames, said spring columns each including a pair of superimposed spring groups of equal deflection rates that have a rigid spring seat member mounted therebetween, and an energy absorber connected between each spring seat and the truck bolster member and a car body bolster mounted on said truck bolster for limited rocking movement transversely of said truck side frames the mounting of said car body bolster on said truck bolster comprising a vertically extending opening in said truck bolster along the longitudinal centerline of the truck, a vertically extending center pin mounted in and projecting upwardly from said opening, a centerplate with an opening therein mounted about the upwardly projecting end of said center pin, said centerplate having portions thereof journaled on said truck bolster to provide for rocking of said centerplate transversely of said truck, a bearing means mounted on said centerplate and a car body bolster support plate mounted on said bearing means for rotation about said center pin and car body stabilizing means comprising a bumper plate mounted on each end of the truck bolster for vertical reciprocation relative thereto, precompressed resilient means that have a limited, progressively increasing, rate of deflection continuously urging said bumper plates upwardly towards said body bolster and bumper blocks mounted on said car body bolster having portions thereof continuously engaged with the bumper plates of said truck bolster.

19. A railway truck comprising longitudinally spaced wheeled axles, transversely spaced side frames mounted on said axles, a plank member extending transversely of and journaled on said side frames for rotation about longitudinally extending axes, resilient means mounted on said plank member, a truck bolster member floatingly supported on said resilient means in overlying relationship to said plank and having end portions projecting outboard of said side frames, and bolster stabilizing links extending longitudinally of the truck between each of the outboard located ends of the truck bolster and the adjacent side frame, said stabilizing links providing the only direct connection between the bolster and side frames and having pivotal connections to the associated truck bolster end and side frame that include pivot axes extending transversely of the truck and substantially horizontal, the said pivotal connections including resilient means that readily permit relative vertical movement between the truck bolster and the side frames while resisting relative lateral and longitudinal movement between the truck bolster and side frames.

20. A railway truck comprising longitudinally spaced wheeled axles, transversely spaced side frames mounted on said axles, a plank member extending transversely of and journaled on said side frames for rotation about longitudinally extending axes, resilient means mounted on said plank member, a truck bolster member floatingly supported on said resilient means in overlying relationship to said plank and having end portions projecting outboard of said side frames, and bolster stabilizing links extending longitudinally of the truck between each of the outboard located ends of the truck bolster and the adjacent side frame so as to provide the only direct connection between the bolster and side frames, said stabilizing links having their connections to the associated truck bolster end and side frame provided with resiliently mounted pivot axes that extend transversely of the truck in a substantially horizontal plane and readily permit relative vertical movement between the truck bolster and the side frames while resisting relative lateral and longitudinal movement between the truck bolster and side frames at a progressively increasing rate, and interengageable stop means to limit the relative lateral movement between said truck bolster and said side frames.

21. A railway truck comprising longitudinally spaced wheeled axles, transversely spaced side frames mounted on said axles, a plank member extending transversely of and journaled on said side frames for rotation about longitudinally extending axes, resilient means mounted on said plank member, a truck bolster member floatingly supported on said resilient means in overlying relationship to said plank and having end portions projecting outboard of said side frames, and bolster stabilizing links extending longitudinally of the truck between each of the outboard located ends of the truck bolster and the adjacent side frame so as to provide the only direct connection of the bolster and side frame, said stabilizing links each having transversely directed, horizontal, pivotal connections to the associated truck bolster end and side frame provided with resiliently mounted pivot means that readily permits relative vertical movement between the truck bolster and the side frames while resisting relative lateral and longitudinal movement between the truck bolster and side frames and a car body bolster rockably mounted on said truck bolster for oscillation about an axis extending longitudinally of the truck, and means to control and limit the oscillation of the car body bolster relative to the truck bolster, said car body oscillation control means including preloaded resilient means that continuously resist oscillation of the car body bolster relative to the truck bolster.

22. In a railway truck, spaced side frames, a bolster extending transversely of the truck side frames and resiliently supported thereon, a centerplate mounted on said truck bolster by a solid pivotal connection permitting rocking of the centerplate relative to the truck bolster about an axis extending transversely of the truck bolster and longitudinally of the truck, a car body bolster mounted on and connected to said centerplate by a pivotal connection permitting rotation of said car body bolster about a vertically extending axis, and means for stabilizing said car body bolster on said truck bolster comprising a bumper block carried by one of said bolsters and a preloaded, resiliently supported, bumper plate carried by the other of said bolsters, said bumper plate and bumper block having portions that are continuously engaged and arranged to resiliently resist rocking of said car body bolster on said truck bolster.

23. In combination with a railway truck that includes a pair of spaced side frames and a truck bolster member resiliently supported thereon, a vertically extending cavity in said truck bolster at the transverse center thereof, a vertically extending center pin loosely mounted in and projecting upwardly from said cavity, a ring-like centerplate encircling the portion of said center pin projecting upwardly from the truck bolster cavity, rocker bearing means depending from the underside of said centerplate and seated on said truck bolster to provide for rocking movement of said centerplate on said truck bolster about an axis extending transversely of the bolster, a car body bolster mounted on the upwardly projecting portion of said center pin and supported on said centerplate for rotation about said center pin, and preloaded resilient means connected between said car body bolster and said truck bolster and arranged to resist relative rocking movement between said bolsters.

24. A railway truck comprising a pair of longitudinally spaced, wheeled axles, a pair of transversely spaced side frames rockably mounted on and extending between said axles, a plank member extending between and supported on said side frames by pivotal connections having pivot axes extending longitudinally of the side frames and substantially horizontally that permit relative vertical movement of the side frames while resisting relative longitudinal movement and maintaining side frame squareness, vertically extending resilient columns mounted on the opposite ends of said plank member, a truck bolster member extending transversely of said side frames in superimposed relationship to said plank and supported only at its opposite ends by said plank mounted resilient columns, a pair of oppositely disposed rigid stabilizing links extending longitudinally of the truck at each side thereof, each link being pivotally connected between an end of the truck bolster and the adjacent side frame and providing the only direct connection between the bolster and side frames, said stabilizing link pivotal connections each including resilient means mounting the associated link pivot in said bolster and side frames respectively for rotation about transversely extending, horizontally disposed, pivot axes so as to provide a means to cooperate with the links to provide a relatively low resistance to relative vertical movement between the truck bolster and side frames, said resilient means being further arranged to provide a relatively high resistance to lateral movement of the truck bolster relative to the side frames, and a car body bolster mounted on said truck bolster for limited rocking movement transversely of said truck side frames, the mounting for said body bolster on said truck bolster including rocker bearing means between the said bolsters located on substantially the longitudinal centerline of the truck and resilient means extending between said bolsters at points spaced from the rocking center thereof resisting any relative rocking movement therebetween.

References Cited in the file of this patent

UNITED STATES PATENTS

| | | |
|---|---|---|
| 1,144,392 | Summers | June 29, 1915 |
| 1,434,499 | O'Connor | Nov. 7, 1922 |
| 1,787,990 | McBride | Jan. 6, 1931 |
| 1,810,718 | Lord | June 16, 1931 |
| 2,018,854 | Hyman | Oct. 29, 1935 |
| 2,274,484 | Janeway | Feb. 24, 1942 |
| 2,316,046 | Buckwalter | Apr. 6, 1943 |
| 2,333,058 | Travilla et al. | Oct. 26, 1943 |
| 2,379,005 | Jackson et al. | June 26, 1945 |
| 2,394,547 | Hickman | Feb. 12, 1946 |
| 2,434,287 | Pflager | Jan. 13, 1948 |
| 2,461,382 | Hunter | Feb. 8, 1949 |
| 2,498,745 | Van Der Sluys | Feb. 28, 1950 |
| 2,500,906 | Soloview | Mar. 14, 1950 |
| 2,533,639 | Travilla | Dec. 12, 1950 |
| 2,555,011 | Schrage | May 29, 1951 |
| 2,578,554 | Janeway | Dec. 11, 1951 |